May 13, 1930.  M. M. CORY  1,758,429
INTERNAL COMBUSTION ENGINE
Filed Sept. 16, 1926

INVENTOR.
MARCUS MAURICE CORY
BY A. B. Bowman
ATTORNEY

Patented May 13, 1930

1,758,429

UNITED STATES PATENT OFFICE

MARCUS MAURICE CORY, OF SAN DIEGO, CALIFORNIA

INTERNAL-COMBUSTION ENGINE

Application filed September 16, 1926. Serial No. 135,789.

My invention relates to internal combustion engines, more particularly that class of internal combustion engines in which the explosive charge is delivered to the explosion chamber under compression equal to or above that at which it is exploded, and the objects of my invention are: first, to provide a simple and easily constructed engine in which the explosive fuel mixture is delivered to the engine cylinder under sufficient pressure to be efficiently exploded in the cylinder; second, to provide an engine of this type in which the timing may be retarded so that more nearly the full force of the explosion is transmitted to the crank-shaft, thus increasing the efficiency of the engine; third, to provide an engine of this class in which greater power is produced by an increased volume of the compressed explosive mixture in the cylinder; fourth, to provide an engine of this class in which, when the explosive volume is larger, the explosive timing is proportionately retarded; fifth, to provide an engine of this class in which the fuel mixture is compressed to a greater pressure than the required explosive pressure, then automatically released into an intermediate tank with different stages of volume in which the separate stages are controlled manually for the purpose of controlling the volume of the explosive mixture delivered to the engine cylinder; sixth, to provide an engine of this class in which the piston moves in its non-work stroke to the end of the cylinder, removing all of the burnt gases therefrom so that the cylinder is completely scavenged with every other stroke of the piston; seventh, to provide an engine of this class which is a two stroke cycle engine, or which will explode with every other stroke of the piston, thus reducing the size of the engine relative to its capacity; eighth, to provide a novelly constructed internal combustion engine; and ninth, to provide an engine of this class which is simple and economical of construction and operation, durable, extremely efficient in its action and which will not readily deteriorate or get out of order.

Figure 1:
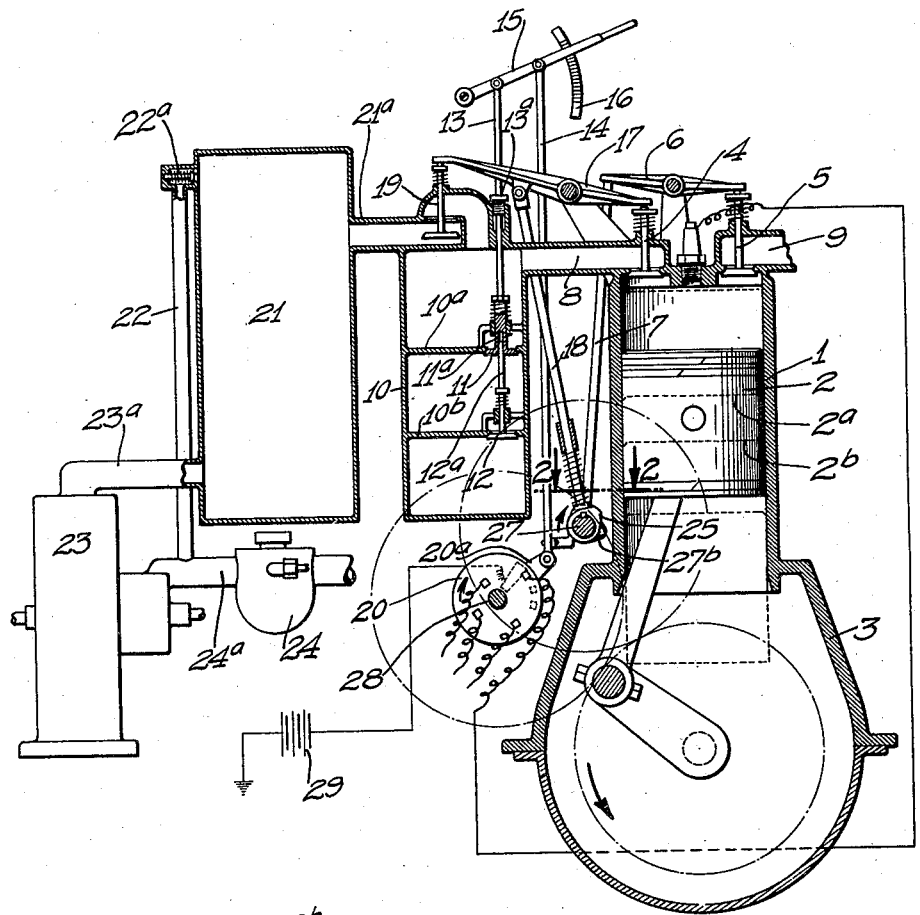
Figure 2:
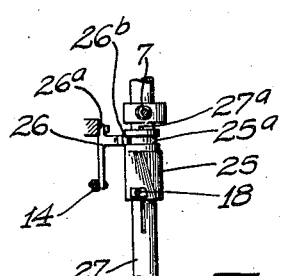

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a diagrammatic partial sectional and partial elevational view of my engine and operating parts and portions, and Fig. 2 is a sectional view through 2—2 of Fig. 1.

Similar characters of reference refer to similar parts and portions throughout the views of the drawings.

The engine cylinder 1, piston 2, crank case 3, inlet valve 4, exhaust valve 5, valve lever 6, tappet rod 7, inlet conductor 8, exhaust conductor 9, intermediate tank 10, valves 11 and 12, rods 13 and 14, lever 15, quadrant 16, valve lever 17, tappet rod 18, valve 19, timer 20, main compression tank 21, conductor 22, compressor 23, carbureter 24, tappet cam 25, tappet cam control lever 26, camshaft 27, exhaust control cam $27^b$, timer shaft 28 and battery 29 constitute the principal parts and portions of my internal combustion engine.

The engine cylinder 1, piston 2, crank case 3, crank and connecting rod may be of the conventional type, and there may be any number of cylinders desired. The cylinder, however, it will be noted, is not provided with any specific combustion chamber in the cylinder head, and the piston is adapted to move to the end of the cylinder.

In the head of the cylinder 1 is the intake valve 4 and exhaust valve 5, which may be any type desired. However, I have shown the ordinary tappet valves positioned in the inlet conductor 8 and exhaust conductor 9, as shown. The exhaust valve is operated by means of the lever 6, which engages the tappet rod 7, which engages at its opposite end the stationary cam member $27^b$. The inlet valve 4 is controlled by the lever 17, the opposite end of which controls the valve 19 so that when the valve 4 is closed, the valve 19 is opened, and vice versa. This lever 17 is operated by means of the tappet rod 18, which engages at its opposite end the cam 25 on the shaft 27. The camshaft 27, together with the cams 25 and 27<sup>b</sup> thereon, operates the valves 4, 5 and 19 automatically with the operation of the engine.

In order to change the timing of the valves 4 and 19 manually, there is provided means for shifting the cam 25 on the shaft 27, it being noted that the cam 25 is supported on the shaft by means of a key in the keyway 27<sup>a</sup> so that the cam may be shifted longitudinally on the shaft 27. This is accomplished by means of the bellcrank lever 26 pivotally mounted at 26<sup>a</sup> and provided with a roller 26<sup>b</sup> which engages the annular groove 25<sup>a</sup> in the cam 25, and with the rod 14 connected with the opposite end of the bellcrank, the cam may be shifted longitudinally with the movement of the lever 15 on the quadrant 16, thus providing for changes in the timing of the valves 4 and 19. Also pivotally connected with the lever 15 is the valve rod 13, which extends into the upper end of the intermediate tank 10, there being provided a stuffing box 13<sup>a</sup> to provide a tight joint around said rod 13. This intermediate tank 10 is provided with partitions 10<sup>a</sup> and 10<sup>b</sup>, thus providing three compartments in the tank 10 and provided for three different quantities of fuel mixture to enter the cylinder 1, as desired. The partition 10<sup>a</sup> is provided with a valve 11 which is operated directly by the rod 13. It is provided with a recess 11<sup>a</sup> in which extends the valve stem 12<sup>a</sup> of the valve 12. The valve 12 is adapted to close the opening in the partition 10<sup>b</sup>. Thus it will be noted that upon certain movement of the lever 15, the rod 13 will open the valve 11 but will not move the valve 12, but upon further movement of the lever 15, both the valves 11 and 12 will be opened, thus connecting all of the compartments of the tank 10.

Communicating with the upper compartment of the tank 10 is a conductor 21<sup>a</sup> leading to the main compression tank 21. Communicating with this main compression tank 21 is a conductor 23<sup>a</sup> leading from the compressor 23, and communicating with the inlet of the compressor 23 is a conductor 24<sup>a</sup>, which extends to the carbureter 24. Leading from the conductor 24<sup>a</sup> to the upper end of the tank 21 is a conductor 22 which is provided with a pressure valve 22<sup>a</sup> therein so that when the pressure in the tank 21 reaches a certain height, the valve 22<sup>a</sup> is opened permitting the fuel mixture to pass through the pipe 22 into the conductor 24<sup>a</sup>.

The timer 20 is operated in the usual manner and is manually controlled by means of the lever 15, rod 14 and arm 20<sup>a</sup> of the timer 20 so that with the movement of the lever 15, the timer is operated. Thus the lever 15 and its connecting parts provide means for manually and simultaneously controlling the movement of the valves 11 and 12, timer 20 and the valves 4 and 19. The timer is electrically connected to the battery 29 and grounded in the usual manner.

It will be here noted that ignition takes place in the cylinder 1 when a volume of fuel from the upper compartment of the tank 10 is permitted to flow into the cylinder during the time the piston is traveling from the end of the stroke to the first or primary position; that when more power is required the valve 4 is opened for a longer and longer time until such a point when the fuel in the second compartment in the tank 10, as well as the first, is permitted to flow into the cylinder, the ignition taking place at a later time, as illustrated by the dotted line position 2<sup>a</sup> of the piston; and if still more power is required, the valve 4 is closed still later and finally all three of the compartments of the tank 10 are utilized in the cylinder 1 and the spark is retarded to the dotted line position 2<sup>b</sup> of the piston 2 or further. It will be here noted that the tank 10 may have any number of compartments so that a plurality of stages of fuel volume may be admitted into the cylinder and the timing of the spark and the closing of the valve 4 retarded in proportion to the volume of fuel admitted.

It will be noted that the shafts 27 and 28 and the compressor 23 are operated by means of gearing or their equivalents from the crankshaft of the engine.

The operation of the engine is as follows:
The compressor 23 provides a fuel mixture of air and hydrocarbon from the carbureter to the tank 21, keeping a constant pressure of approximately double the amount of the explosive mixture pressure. With the operation of the engine, the fuel from the tank 21 will enter the upper compartment of the tank 10, and with further movement of the shaft 27, the valve 19 will be closed and the valve 4 opened, the volume in the upper part of the tank 10 being equal to the average of the first volume stages of the explosive mixture in the cylinder 1, the pressure being reduced approximately one-half so that the fuel mixture in the cylinder will be of the proper compression for operative purposes. This fuel mixture will pass into the cylinder as the piston recedes. When it reaches the first stage, approximately that shown by solid lines of the piston in Fig. 1 of the drawings, the valve 4 closes and ignition will take place so that only the fuel from the first compartment of the tank 10 will be utilized. For slight increase in power the valve 4 closes later and ignition is retarded and vice versa. When it is desired to increase the power still more, the second compartment will be connected with the first compartment by opening the valve 11, whereupon a larger quantity of fuel mixture will enter the cylinder and the spark will be retarded accordingly; and in case more power is desired, the third compartment will be opened by opening the valve 12 so that the valves 11 and 12 are open and all of the compartments of the tank 10 communicate with the cylinder, whereupon the valve 4 closes later and the spark or ignition will be retarded until the piston recedes further, as shown by dotted line 2ᵇ in Fig. 1 of the drawings. Thus, it will be noted that constant pressure, approximately double that of the amount required for proper operation of the engine, depending upon volume ratio between the tank 10 and explosive charges, is kept in the tank 21, and this same pressure is kept in either one or all of the compartments in the tank 10, but with the closing of the valve 19 and the opening of the valve 4, the pressure will be reduced approximately one-half in the cylinder between the piston and cylinder head at the time ignition takes place and the volume of fuel in the cylinder increased or decreased at the same time the spark is retarded or advanced.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

It is obvious that instead of the partitions 10ᵃ and 10ᵇ and valves 11 and 12 in the tank 10, the said tank may be utilized as a cylinder and a piston used therein operated by a rod similar to the rod 13 by the lever 15 for varying the quantity of the fuel mixture in the various volumes to be utilized in the cylinder, this being an obvious substitution for the partitions 10ᵃ and 10ᵇ with their valves. It is also obvious that any number of cylinders may be connected, as herein shown, with one or more tanks.

Having thus described my invention, what I claim as new and desire to secure by Letters Patent is:

1. In an internal combustion engine, a cylinder, a piston reciprocally mounted therein, compression, multiple storage tank and valve means for controlling and conducting fuel mixture to said cylinder in variable volume, and means simultaneously operating therewith for igniting the mixture in said cylinder at constant pressure for each ignition position of the piston in said cylinder during the receding action of the piston.

2. In an internal combustion engine, a cylinder, a piston reciprocally mounted therein, a compressor storage tank, multiple storage tank, and control valves for controlling and conducting fuel mixture to said cylinder, said control valves and multiple storage operated simultaneously with the ignition for igniting the fuel mixture in variable volume simultaneously with constant pressure for each ignition position of the piston in the cylinder during the receding action of the piston.

3. In an internal combustion engine, a cylinder, a piston reciprocally mounted therein, compression, variable volume storage and valve means for controlling and conducting fuel mixture to said cylinder in variable volume, and means simultaneously operated therewith for igniting the mixture in said cylinder at constant compression in said cylinder during the receding action of the piston.

4. In an internal combustion engine, a cylinder, a piston reciprocally mounted therein, a compressor storage tank, variable volume storage tank means, and control valves for controlling and conducting fuel mixture to said cylinder, said control valves and variable volume storage operated simultaneously with the ignition for igniting the fuel mixture in variable volume simultaneously with constant pressure for each ignition position of the piston in the cylinder during the receding action of the piston.

In testimony whereof, I have hereunto set my hand at San Diego, California, this 2nd day of September, 1926.

MARCUS MAURICE CORY.